March 21, 1933. A. R. KLINGLOFF 1,902,247
PACKING
Filed May 21, 1932
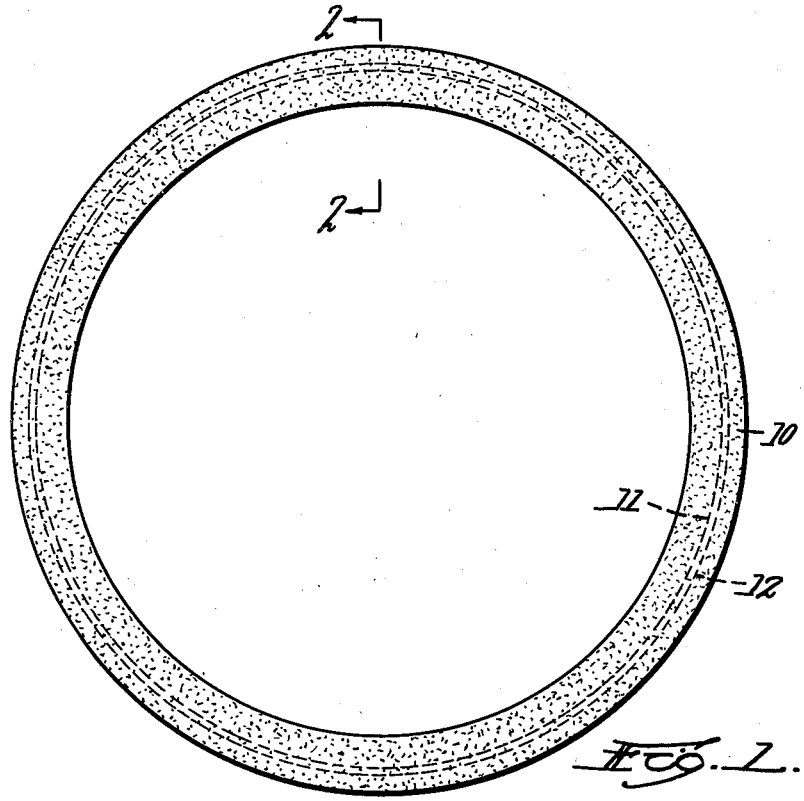
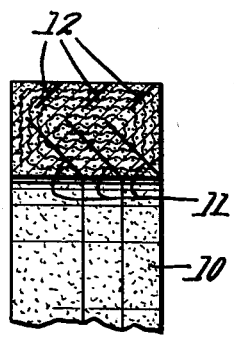
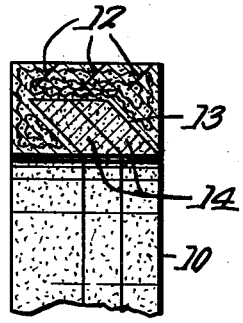
Inventor
Andrew R. Klingloff
By Attorneys Patented Mar. 21, 1933

1,902,247

UNITED STATES PATENT OFFICE

ANDREW R. KLINGLOFF, OF SHREWSBURY, MASSACHUSETTS

PACKING

Application filed May 21, 1932. Serial No. 612,829.

This invention relates to a packing for general purposes, such as steam, cold or hot water and other fluids.

The principal objects of the invention are to provide a packing, the amount of flexibility of which will provide a capacity for free expansion that will allow the packing to accommodate itself to an untrue or worn rod passing through it, or any other article to which it may be applied; to provide a simple packing which will automatically prevent its own leakage and keep the friction at a minimum; to provide, in case the packing is to be used for cold water, for further reducing the friction and decreasing the wear by inserting conical shaped rings made of another material having a smaller coefficient of friction than the main part of the packing; and to provide these features in an extremely simple and inexpensive form without making the packing in more than one piece, and without adding any expensive features to it.

Other objects and advantages of the invention will appear hereinafter.

Reference is to be had to the accompanying drawing, in which

Fig. 1 is a plan of the packing ring constructed in accordance with this invention;

Fig. 2 is a radial sectional view on the line 2—2 of Fig. 1, and

Fig. 3 is a similar view showing the packing as modified when used for cold water.

I have shown the invention as employed with a packing ring formed of rubberized fabric, but it can be made of other materials in accordance with the fluid which it is required to withstand and the pressures of the same. I prefer to use it on an annular cylindrical ring 10 but it can be accommodated to packings of other shapes.

The material of the packing is simply provided with a series of inclined or conical slits 11, preferably closed, extending in from the inside, and also preferably with a series of inclined or conical slits 12 extending in from the outside surface. These slits are not formed long enough to intersect each other but they terminate short of each other and leave the body of the packing material extending across the ring between them, so that it is a unitary packing holding itself together at all times.

On account of the way in which all packings are used under pressure between two opposite surfaces, these slits do not render the packing any less durable in practice. They give the packing capacity for free expansion and contraction with little or no tightening of the gland nuts after once being set, as the inner and outer surfaces of the packing are free to come and go. Being automatic in action, the pressure behind the packing will prevent its own leakage, and keep the friction at a minimum.

By providing the slits or grooves on the inside cylindrical surface that comes in contact with a rod that passes through the packing, and on the outside surface that comes in contact with the stuffing box, the tension of the ordinary solid packing is released, and instead the packing is given a free expansive capacity that will yield to cooperate with an untrue or worn rod or box.

In the form of the invention shown in Fig. 3, the grooves or slits 12 are employed and also a recess is cut out on the inner side along conical surfaces 13, and in this recess are inserted conical shaped rings 14 of leather or other desired material. In all cases the slits or surfaces 11, 12 and 13 are made at about an angle of 45°. The inserted rings 14 are made separate for a cold water packing, as otherwise they would burn if vulcanized with the other material. It will be noticed that with or without the inserted rings 14, the packing has the same slits and grooves, and the same expansion features as well as the properties of being all in one piece and having no external additions to the usual packing.

Although I have illustrated and described only two forms of the invention, I am aware of the fact that other changes can be made therein by any person skilled in the art without departing from the scope of the invention as expressed in the claims. Therefore, I do not wish to be limited to the forms shown, but what I do claim is:—

1. As an article of manufacture, a packing consisting of a ring of packing material having conical slits extending into the packing from the outside cylindrical surface thereof, the material on both sides of each slit contacting.

2. As an article of manufacture, a packing ring formed of rubberized fabric or the like in a solid piece and having a plurality of conical slits extending into the body of the packing from the inner and outer surfaces thereof, the inner edge of each slit on the inside terminating between the inner edges of two of the slits on the outside.

3. As an article of manufacture, a packing ring having a cylindrical inner and a cylindrical outer surface composed of a single body of packing material and provided with a series of conical parallel slits extending into the body of the packing from said outer surface, said slits being arranged at an angle of approximately 45° to the surface from which they enter.

4. As an article of manufacture, a packing for use with cold water having on the inner surface thereof an inclined recess, and a ring located in said recess and flush with the surface of the packing, said packing having a series of conical slits extending inwardly from its outer surface.

5. As an article of manufacture, a packing for use with cold water having on the inner surface thereof a recess bounded at its two ends by conical surfaces, and rings of non-vulcanizable material located in said recess and flush with the surface of the packing.

In testimony whereof I have hereunto affixed my signature.

ANDREW R. KLINGLOFF.